United States Patent
Zhu et al.

(10) Patent No.: US 10,200,432 B2
(45) Date of Patent: *Feb. 5, 2019

(54) HTTP STREAMING CLIENT ADAPTATION ALGORITHM BASED ON PROPORTIONAL-INTEGRAL CONTROL

(71) Applicant: Cisco Technology, Inc., San Jose, CA (US)

(72) Inventors: Xiaoqing Zhu, Austin, TX (US); Zhi Li, Mountain View, CA (US); Rong Pan, Saratoga, CA (US); Joshua B. Gahm, Newtonville, MA (US); Hao Hu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,714

(22) Filed: Sep. 26, 2016

(65) Prior Publication Data

US 2017/0013041 A1 Jan. 12, 2017

Related U.S. Application Data

(63) Continuation of application No. 14/012,225, filed on Aug. 28, 2013, now Pat. No. 9,485,289.

(51) Int. Cl.
*G06F 15/16* (2006.01)
*H04L 29/06* (2006.01)
(Continued)

(52) U.S. Cl.
CPC ............ *H04L 65/601* (2013.01); *H04L 47/25* (2013.01); *H04L 47/30* (2013.01); *H04L 47/38* (2013.01);
(Continued)

(58) Field of Classification Search
CPC ......... H04L 47/25; H04L 47/30; H04L 47/38; H04L 65/60; H04L 65/608; H04L 67/02
(Continued)

(56) References Cited

U.S. PATENT DOCUMENTS 6,173,207 B1 1/2001 Eidson
6,449,647 B1 9/2002 Colby et al.
(Continued)

FOREIGN PATENT DOCUMENTS

CN 102498715 A 6/2012
CN 103179107 A 6/2013

OTHER PUBLICATIONS

Akhshabi, et al., "What Happens When HTTP Adaptive Streaming Players Compete for Bandwidth?", Network and Operating System Support for Digital Audio and Video, NOSSDAV, Jun. 7-8, 2012, 6 pages, Association for Computing Machinery, Toronto, Ontario, Canada.

(Continued)

*Primary Examiner* — Thuong Nguyen
(74) *Attorney, Agent, or Firm* — Parker Ibrahim & Berg LLP; James M. Behmke; Stephen D. LeBarron

(57) ABSTRACT

In one embodiment, an HTTP streaming session may be initiated at a client device in a network. The client device may have a buffer and may be configured to request and receive one or more data segments over HTTP from an HTTP server. A first data segment at a first data source rate may be requested and subsequently received. The first data segment may be stored in the buffer. A second data source rate may then be calculated based on a storage level in the buffer, and a second data segment at the second data source rate may be requested.

20 Claims, 7 Drawing Sheets

(51) Int. Cl.
  *H04L 12/811* (2013.01)
  *H04L 12/825* (2013.01)
  *H04L 12/835* (2013.01)
  *H04L 29/08* (2006.01)

(52) U.S. Cl.
  CPC ............ *H04L 65/60* (2013.01); *H04L 65/608* (2013.01); *H04L 67/02* (2013.01)

(58) Field of Classification Search
  USPC .............. 709/219, 217, 237, 231, 234, 227; 370/229, 389, 253, 235
  See application file for complete search history.

(56) References Cited

U.S. PATENT DOCUMENTS

| | | | |
|---|---|---|---|
| 7,310,680 | B1 | 12/2007 | Graham |
| 7,389,354 | B1 | 6/2008 | Sitaraman et al. |
| 7,949,775 | B2 * | 5/2011 | Virdi ................... H04N 21/2358 709/231 |
| 9,485,289 | B2 * | 11/2016 | Zhu ......................... H04L 65/60 |
| 2006/0056523 | A1 | 3/2006 | Guillotel et al. |
| 2006/0126507 | A1 | 6/2006 | Nakayasu |
| 2006/0233155 | A1 | 10/2006 | Srivastava |
| 2007/0011329 | A1 | 1/2007 | Albert et al. |
| 2010/0299552 | A1 | 11/2010 | Schlack et al. |
| 2013/0332623 | A1 | 12/2013 | Gahm et al. |
| 2014/0173025 | A1 | 6/2014 | Killick |

OTHER PUBLICATIONS

Mansy, et al., "SABRE: A Client Based Technique for Mitigating the Buffer Bloat Effect of Adaptive Vidoe Flows", Multimedia Systems Conference, MMSys, Feb. 26-Mar. 1, 2013, pp. 214-225, Association for Computing Machinery, Oslo, Norway.

Anantakrishnan et al., "What Happens When Most of the Traffic on Your Network is Adaptive Bitrate Streaming? Insights from Experiments in ABR Scaling," in CTECH Forum, Nov. 2012, 8 pages.

Zhu et al., "Fixing Multi-Stream Oscillations in Adaptive HTTP Streaming: A Control Theoretic Approach", 15th IEEE International Workshop on Multimedia Signal Processing, Sep.-Oct. 2013, 8 pages, Institute of Electrical and Electronics Engineers, Sardinia, Italy.

Wirth et al., "Advanced downlink LTE radio resource management for HTTP-streaming", Proceedings of the 20th ACM International Conference on Multimedia, MM '12, Jan. 1, 2012, New York, New York, USA.

International Search Report dated Dec. 16, 2014 in connection with PCT/US2014/052530.

* cited by examiner

HTTP STREAMING CLIENT ADAPTATION ALGORITHM BASED ON PROPORTIONAL-INTEGRAL CONTROL

RELATED APPLICATION

The present application is a Continuation Application of U.S. patent application Ser. No. 14/012,225, filed Aug. 28, 2013, entitled HTTP STREAMING CLIENT ADAPTATION ALGORITHM BASED ON PROPORTIONAL-INTEGRAL CONTROL, by Xiaoqing Zhu et al., the contents of which is hereby incorporated by reference.

TECHNICAL FIELD

The present disclosure relates generally to computer networks, and, more particularly, to hypertext transfer protocol (HTTP) streaming client adaptation algorithms.

BACKGROUND

A large portion of today's Internet video content is consumed in web browsers via adaptive hypertext transfer protocol (HTTP) streaming. The technology is supported by many commercially deployed systems. The video delivery mechanism driven by the client device, e.g., computer, laptop, tablet, smart phone, etc., can dynamically change the rate and quality of the video it requests, segment by segment, based on varying network conditions, such as available bandwidth and CPU resources.

While the adaptive streaming approach is effective for a single adaptive HTTP streaming client, which can readily respond to changes of a last-mile "bottleneck" link, many technical issues arise when multiple clients with currently deployed rate adaptation logic are competing for shared bandwidth. Under such a scenario, the video source rate requests from the individual client devices often fail to converge to their underlying fair share of bandwidth over time. This situation, colloquially termed the "multi-client oscillation problem," leads to constant quality oscillations in the received video stream.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an HTTP streaming session may be initiated at a client device in a network. The client device may have a buffer and may be configured to request and receive one or more data segments over HTTP from an HTTP server. A first data segment at a first data source rate may be requested and subsequently received. The first data segment may be stored in the buffer. A second data source rate may then be calculated based on a storage level in the buffer, and a second data segment at the second data source rate may be requested.

Description

Figure 1:
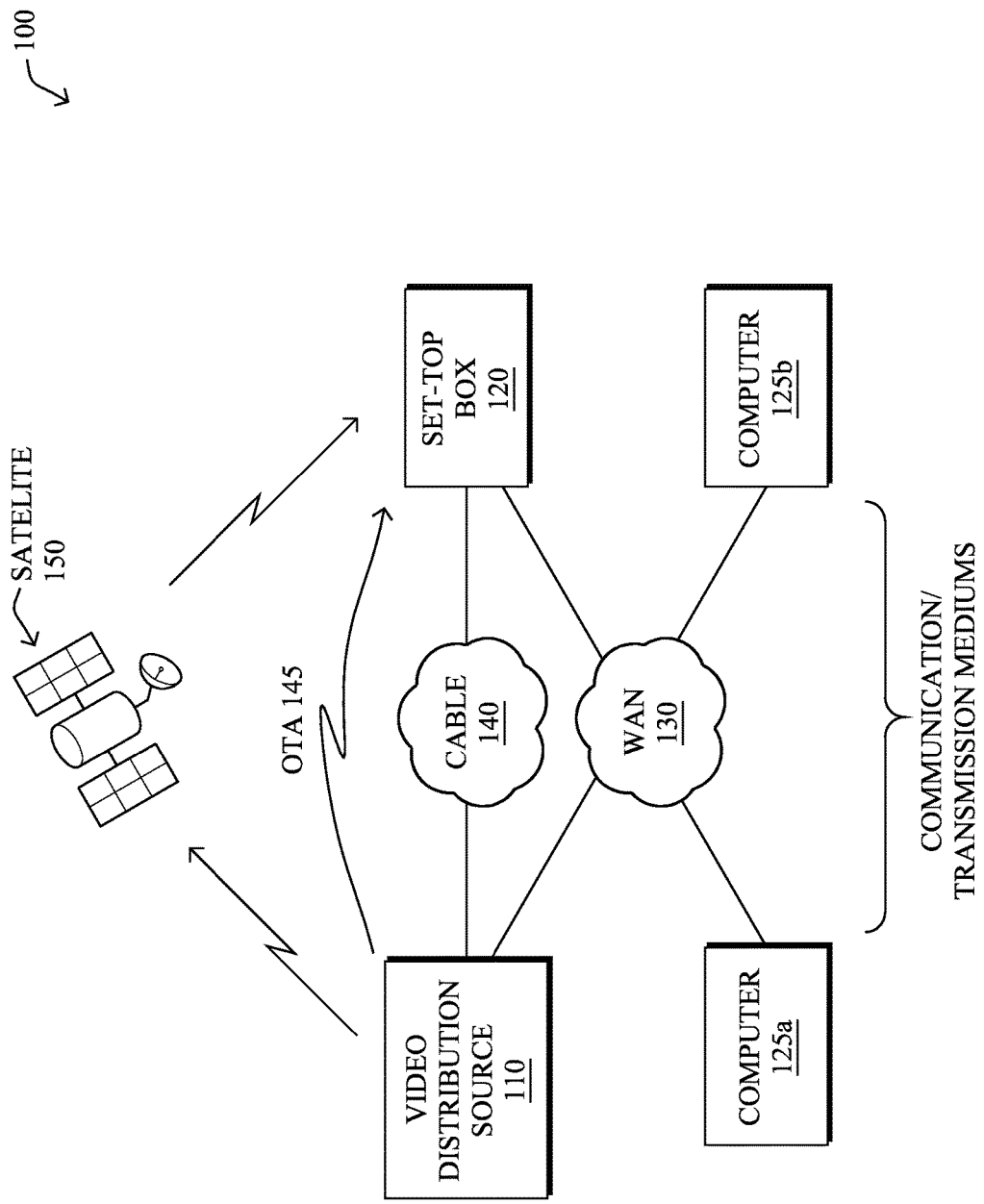
FIG. 1 illustrates an example video communication network.

FIG. 1 is a schematic block diagram of an example communication network 100 illustratively comprising nodes/devices, such as a video distribution source 110 configured to distribute video to one or more set-top boxes (STBs) 120 and/or one or more computers 125 (e.g., 125a and 125b). For instance, video may be distributed by source 110 in any number of available mediums, such as video-over-IP (Internet Protocol) via wide area network (WAN) 130, through a cable network 140, over-the-air (OTA) transmissions 145, or satellite transmission 150, etc. Also, in certain embodiments, a computer (e.g., personal computer or "PC") may distribute video over WAN 130 to other receiving devices, as will be appreciated by those skilled in the art. For example, two or more computers may participate in a video sharing application (video chat, online conferencing, etc.). Those skilled in the art will understand that any number of nodes, devices, links, etc. may be used in the communication network 100, and that the view shown herein is for simplicity.

Note that a set-top box (STB) 120 may consist of a converter box (e.g., a universal media server or "UMS") used by air (antenna), video digital subscriber line (DSL), IP, cable, and/or satellite service providers to convert proprietary signals (from video distribution source 110) into audio and/or video (A/V) outputs for STB users, e.g., images for a television and/or monitor. Similarly, a computer 125 may also be configured to convert such signals into A/V streams for display on an associated monitor (primarily these are DSL or IP signals, though other signals may also be converted provided proper equipment and configuration).

Figure 2:
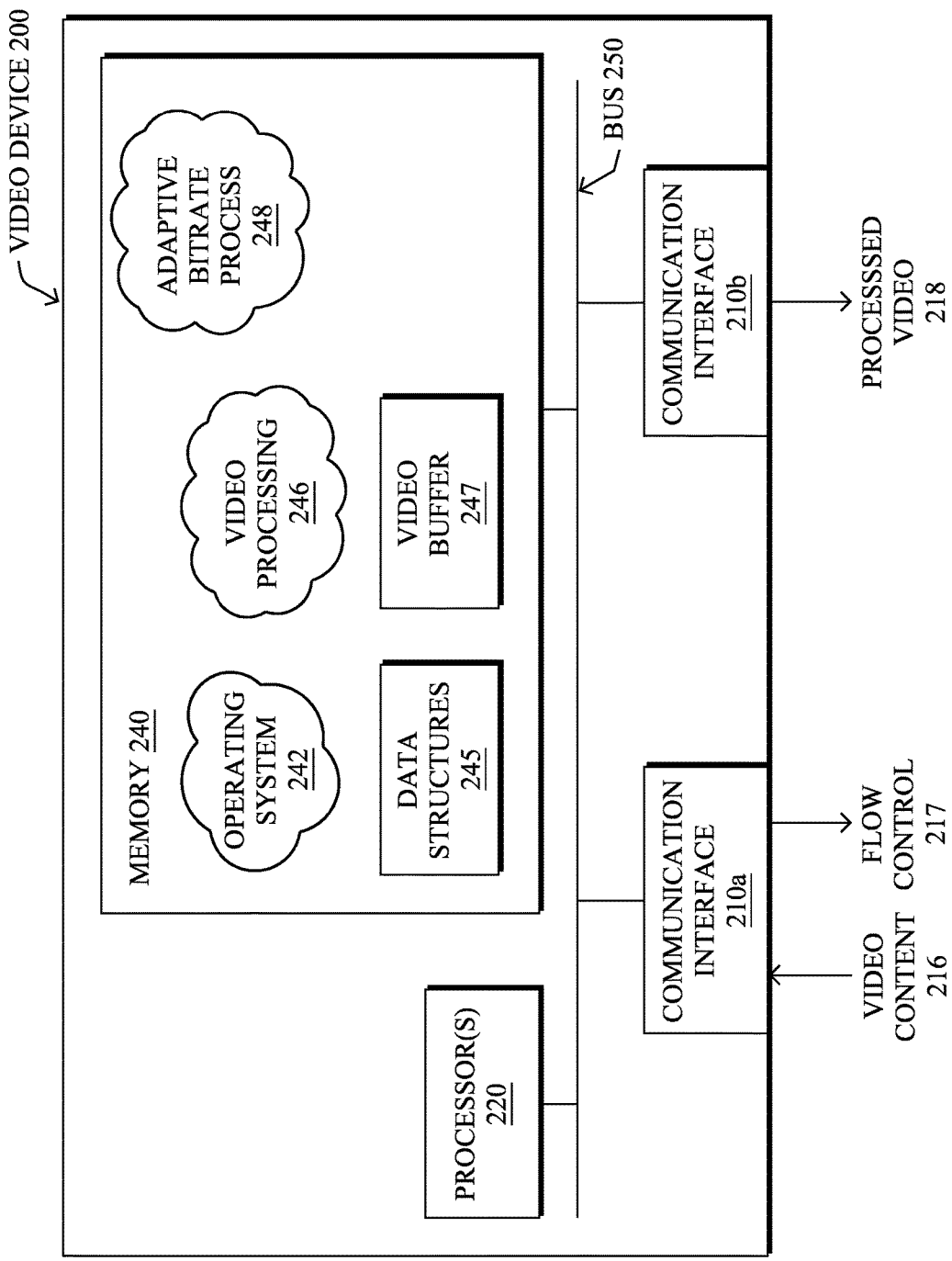
FIG. 2 illustrates an example video device/node for the client.

FIG. 2 is a schematic block diagram of an example client node/device 200 that may be used with one or more embodiments described herein, e.g., as any node/device in FIG. 1 capable of processing video as described herein, such as the video distribution receiver 120 and/or computers 125. The device may comprise one or more communication interfaces 210, at least one processor 220, and a memory 240 interconnected by a system bus 250.

The communication interface(s) 210 contain the mechanical, electrical, and signaling circuitry for communicating data (e.g., video) over various transmission mediums of the network 100. For instance, the interfaces may be configured to transmit and/or receive data using a variety of different communication protocols suitable for the transmission mediums as noted above and as will be understood by those skilled in the art. Note, further, that the device may have a first communication interface 210a, such as an Internet Protocol (IP) interface for communication over the WAN 130, and a second communication interface 210b, such as a video output interface (e.g., to a monitor or other display device).

The memory 240 comprises a plurality of storage locations that are addressable by the processor 220 for storing software programs and data structures associated with the embodiments described herein. The processor 220 may comprise necessary elements or logic adapted to execute the software programs and manipulate the data structures 245 (e.g., tables, values, etc.), such as an explicitly shown video buffer 247 (e.g., a single buffer or representative of a separate TCP receive buffer and video decoder buffer). An operating system 242, portions of which are typically resident in memory 240 and executed by the processor, functionally organizes the device by, inter alia, invoking operations in support of software processes and/or services executing on the device. These software processes and/or services may comprise an illustrative video processing process 246, as well as an adaptive bitrate (ABR) process 248 for use as described herein. Other processes, such as routing processes to allow communication over an IP network, are not shown for simplicity.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes may have been shown separately or in combination, those skilled in the art will appreciate that processes may be routines or modules within other processes, or else standalone processes, accordingly.

As mentioned above, a large portion of today's Internet video content is consumed in web browsers via adaptive HTTP streaming. The technology is supported by many commercially deployed systems. The video delivery mechanism driven by the client device, e.g., computer, laptop, tablet, smart phone, etc., can dynamically change the rate and quality of the video it requests, segment by segment, based on varying network conditions, such as available bandwidth and CPU resources. For example, when experiencing temporary network congestion, a client device can switch to a lower quality version of the video to avoid buffer underflow. Then, when connection speed recovers, the client device can switch back to higher quality.

Figure 3:
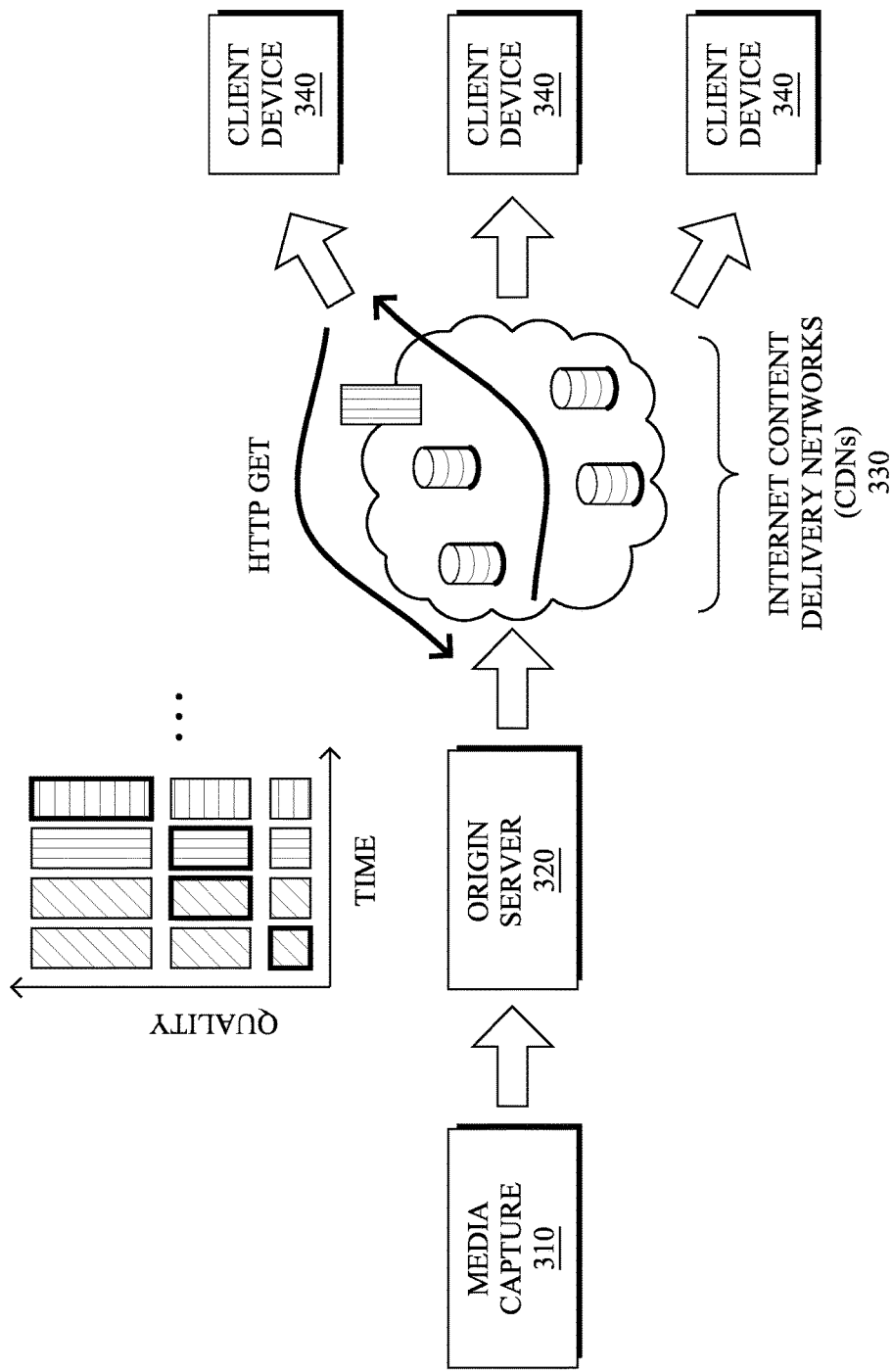
FIG. 3 illustrates an example adaptive HTTP streaming architecture.

In this regard, FIG. 3 illustrates an example adaptive HTTP streaming architecture. The architecture 300 includes a media capture stage 300 where media contents may be either pre-stored or captured live at the source. Multiple quality versions of the media content, e.g., multiple bitrate versions, may be generated via a suitable processing operation, such as transcoding. Moreover, each media file may be broken down into many small data segments, or more specifically, video segments. At an origin server stage 320, the origin HTTP server may keep track of these data segments using a variety of techniques, including, for example, as a large collection of separate physical files, or as logical separations via indexing. At an internet content delivery networks stage 330, additional content delivery networks (CDNs) may also be leveraged at the edge of the network, so as to assist in disseminating video contents to a wide range of end users. At a client devices stage 340, client devices, such as the device 200 shown in FIG. 2, may request and receive the media content. The media content may be received in a plurality of segments. Further, the quality, e.g., bitrate, of the requested segments may vary according to current network constraints experienced by the particular client device.

Figure 4:
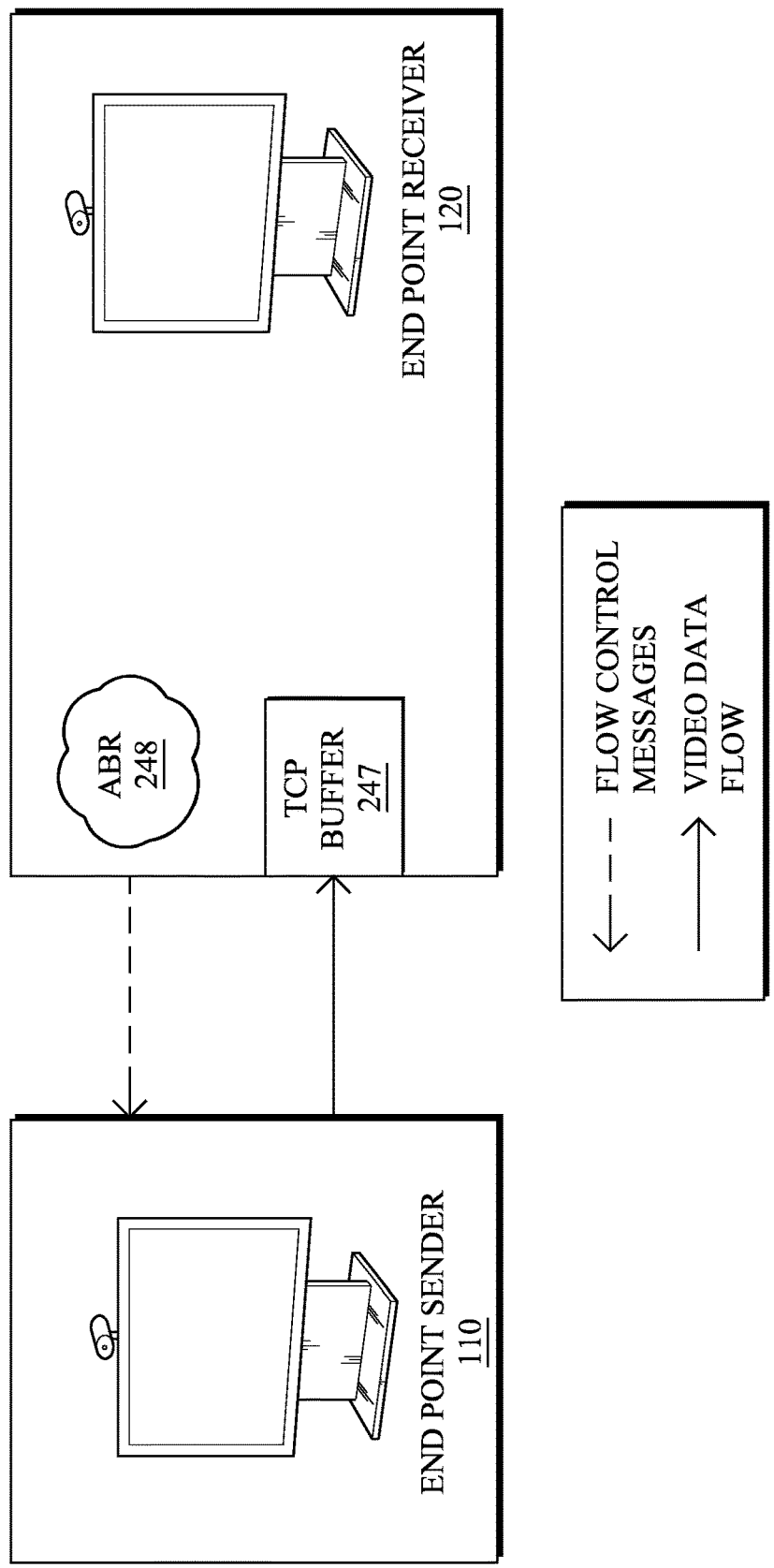
FIG. 4 illustrates an example adaptive HTTP streaming network with a single client device.

FIG. 4 illustrates an example adaptive HTTP streaming network with a single client device. The endpoint receiver 120 may send a video request message to the endpoint video sender 110 using, for example, the ABR process 248. In response, endpoint video sender 110 may send a video flow to the endpoint video receiver 120, where it is received into a TCP buffer (e.g., video buffer 247). The ABR process 248 may then request the same video rate or a different video rate, based on current network constraints, CPU resources, and/or the occupancy levels of the buffers.

However, when multiple clients compete over a common bottleneck link, individual streams often fail to converge to their underlying fair share of bandwidth. For example, several family members may watch different programs via an internet-enabled video streaming service from on their respective devices, e.g., laptop, tablet, smartphone, etc., in a home network, e.g., WAN. In such a case, individual clients typically experience oscillations in the rate and quality of the video stream it receives, and fail to converge to their underlying fair share of the bottleneck bandwidth.

Figure 5:
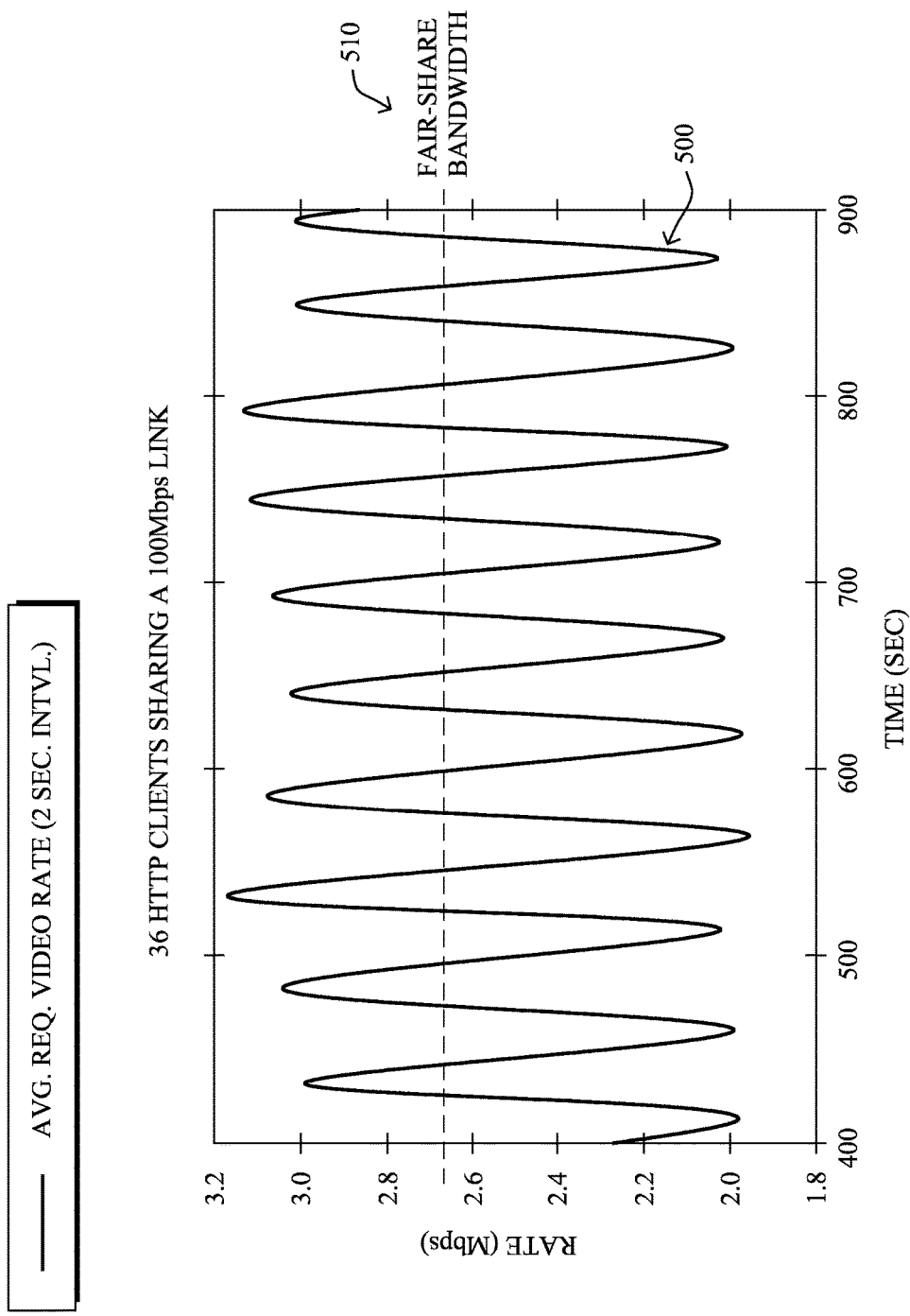
FIG. 5 illustrates an example of network performance affected by the multi-client oscillation problem.

Along the same lines, FIG. 5 illustrates an example of network performance affected by the multi-client oscillation problem. Illustratively, the requested video rate 500 is averaged across 36 HTTP streaming clients sharing a 100 Mbps link. Each client can choose from 10 alternative quality versions of the same video content, with bitrates ranging from 230 Kbps to 10 Mbps. It can be observed that the average requested video rate 500 varies periodically between 2 Mbps and 3 Mbps, instead of converging to the per-client fair share of bandwidth 510 at 2.7 Mbps. Consequently, the video viewed by individual clients experience frequent quality shifts. Furthermore, the clients tend to up-shift or downshift their rates at about the same time, even though their start times are randomly spaced.

A fundamental cause to the lack of coordination between competing clients can be attributed to the HTTP clients systematically over-estimating their fair share of the bottleneck bandwidth whenever the network is under-utilized. As a result, the estimated bandwidth changes drastically when the offered load over the network shifts between 99% and 101%, an effect known as the "bandwidth estimation cliff." Since individual clients measure bandwidth based on segment download time, they can undergo a vicious cycle of overestimating their own share of bandwidth, up-shifting in video rate request, observing prolonged segment download time, and then down-shifting video rate requests, and so forth. Consequently, the system may never converge to a stable share of bandwidth among competing clients.

HTTP Streaming Client Adaptation Algorithm

The techniques herein provide a client rate adaptation algorithm which remedies the multi-stream oscillation problem prevalent in the existing HTTP streaming systems. The disclosed scheme aims at stabilizing the playout buffer at a reference level, and chooses the rate of the next video segment via a proportional-integral controller (PIC). At a steady state, the PIC client naturally matches the requested video rate with its long-term fair share of bandwidth. Moreover, elimination of the "off-period," e.g., period between segment requests, helps in fetching the video segments by avoiding the so-called "bandwidth estimation cliff" phenomenon encountered by conventional clients. Also, the control-theoretic approach using the PIC allows for more precise control of the tradeoff between system stability and settling time, as well as better understanding of various system performance parameters, e.g., reference playout buffer level and video segment duration, which are described in further detail below.

Specifically, according to one or more embodiments of the disclosure as described in detail below, an HTTP streaming session may be initiated at a client device in a network. The client device may have a buffer and may be configured to request and receive one or more data segments over HTTP from an HTTP server. A first data segment at a first data source rate may be requested and subsequently received. The first data segment may be stored in the buffer. A second data source rate may then be calculated based on a storage level in the buffer, and a second data segment at the second data source rate may be requested.

Illustratively, the techniques described herein may be performed by hardware, software, and/or firmware, such as in accordance with the adaptive bitrate process 248, which may contain computer executable instructions executed by the processor 220 (or independent processor of interfaces 210) to perform functions relating to the techniques described herein, e.g., in conjunction with video processing process 246. For example, the techniques herein may be treated as extensions to conventional protocols, such as the various adaptive bitrate protocols (e.g., on host/receivers 120 in particular), and as such, may be processed by similar components understood in the art that execute those protocols, accordingly.

Operationally, the disclosed client rate adaptation algorithm is driven by at least two principal concepts. The first concept involves eliminating (or at least reducing) pausing intervals between successive client requests. The client may persistently request the next video segments until the playout buffer of the client has reached the maximum limit, e.g., the client buffer is full. Persistent HTTP requests eliminate gaps between successive requests in conventional clients and avoid the bandwidth estimation cliff by ensuring full utilization of the network at all times. A possible exception occurs when the network can accommodate all clients at their highest video rates and still spare extra bandwidth. In such a case, there may be no need to persistently request subsequent data segments since network resources are over-provisioned.

The second concept involves deriving the video request rate solely from the client buffer level. In particular, the disclosed rate adaptation algorithm follows the form of a PIC, and strives to stabilize the playout buffer at a reference level. This allows for rigorous guarantees of system stability in face of sudden bandwidth changes. Moreover, controller parameters in the algorithm can be tuned to strike a balance between stability and responsiveness.

Once an HTTP client device in a network initiates an HTTP streaming session, the client device may request a first data segment at a first data source rate. Notably, the client device may be engaged in the HTTP streaming session while a plurality of other client devices in the network are engaged in respective HTTP streaming sessions. Moreover, the client device and the plurality of other client devices may receive data segments over a shared communications link, as illustrated in FIG. 5 by link 520. After the request is made, the first data segment (at the first data source rate) may be received at the client device from an HTTP server.

As described above, the data/video segments received by the HTTP client device may be stored in the video buffer 247. The buffer level may be measured in terms of the number of stored segments or, in the case of received video segments, the playout time of the stored segments. For the purposes of the present disclosure, the duration of a particular video segment may be designated as tau. Therefore, a playout buffer containing N segments may have a playout duration of N*tau.

After storing the received data segments, the client device may calculate a second data source rate based on a storage level in the buffer. In this regard, each client device may first determine a reference playout buffer level $L_o$ (in terms of playout time). The reference playout buffer level $L_o$ may correspond to an "optimal" playout buffer level for the particular client device(s). Typically, desired buffering levels in adaptive HTTP streaming systems may fall between 10-30 seconds. Additionally, the client device(s) may observe the actual playout buffer level L over time.

Before asking for the next video segment, e.g., "second data segment," the client device may calculate the target video source rate R, e.g., "second data source rate." Given the observation of the current client buffer level L, the client device may calculate the target video source rate R for the next segment to fetch as according to the following Formula (1):

$$R = R_{last} + \text{kappa}*(L-L_o) + \text{eta}*(L-L_{last}). \tag{1}$$

For the purposes of the present disclosure, R is the second/newly calculated data source rate, $R_{last}$ is the first data source rate, e.g., the video source rate from the previous calculation, L is the current storage level in the buffer, $L_o$ is a predetermined reference storage level in the buffer, $L_{last}$ is a previous storage level in the buffer, e.g., the last observed playout buffer level, kappa is a first predetermined scaling parameter, and eta is a second predetermined scaling parameter, as described in further detail below.

Notably, the Formula (1) demonstrates the influence of buffer level offset on the rate choice. In particular, when the current buffer build-up exceeds the reference level, there exists an incentive to increase the video source rate. Moreover, Formula (1) reflects the impact of the rate of change in the buffer level. In particular, rapid increase in buffer level encourages higher video source rate whereas decrease in buffer level leads to rate downshifting.

In many cases, each client device may also set a maximum limit for its playout buffer. In such case, the device may refrain from requesting for new data segments whenever the observed buffer level reaches this limit. Moreover, the scaling parameters kappa and eta may be fixed at the client device in any given session. Their values may be chosen based on video segment duration and expected range of available bandwidth.

Accordingly, the second data source rate may be calculated solely based on a storage level in the buffer of the respective client device. In addition, the second data source rate calculation may further be based on a predetermined reference storage level, e.g., the reference playout buffer level $L_o$, and/or the first data source rate, e.g., the video source rate from the previous calculation $R_{last}$. Once calculation of the new/second data source rate is complete, the respective device may request a second data segment at the second data source rate. Importantly, and as mentioned above, the client device may calculate the second data source rate and request the second data segment at the second data source rate substantially immediately after the first data segment is requested, so as to eliminate pausing intervals between successive client requests.

Over time, the client playout buffer may evolve according to the following formula (2):

$$L = \max[L_{last} + C*\text{tau}/R_{last} - \text{tau}, 0]. \tag{2}$$

For the purposes of the present disclosure, C designates the client device's available bandwidth over TCP, while the remaining variables correspond to those utilized in Formula (1). According to Formula (2), for every tau seconds, the amount of data arriving at the buffer is C*tau, which will eventually be played out at the source rate of $R_{last}$. Measured in terms of playout time, the playout buffer drains by tau seconds, and is replenished by C*tau/$R_{last}$ seconds.

It can therefore be shown that by following Formulas (1) and (2), the client buffer level L may stabilize at the buffer reference level $L_o$ over time. As a result, instead of estimating bandwidth based on observed segment download time from the past, the client playout buffer level may be stabilized over time, e.g., the video source rate R may match the available network bandwidth C. Also, by formulating the rate adaptation problem as a proportional-integral controller (PIC), the proposed algorithm can quickly converge to the video source rate that matches the client's available bandwidth.

Figure 6:
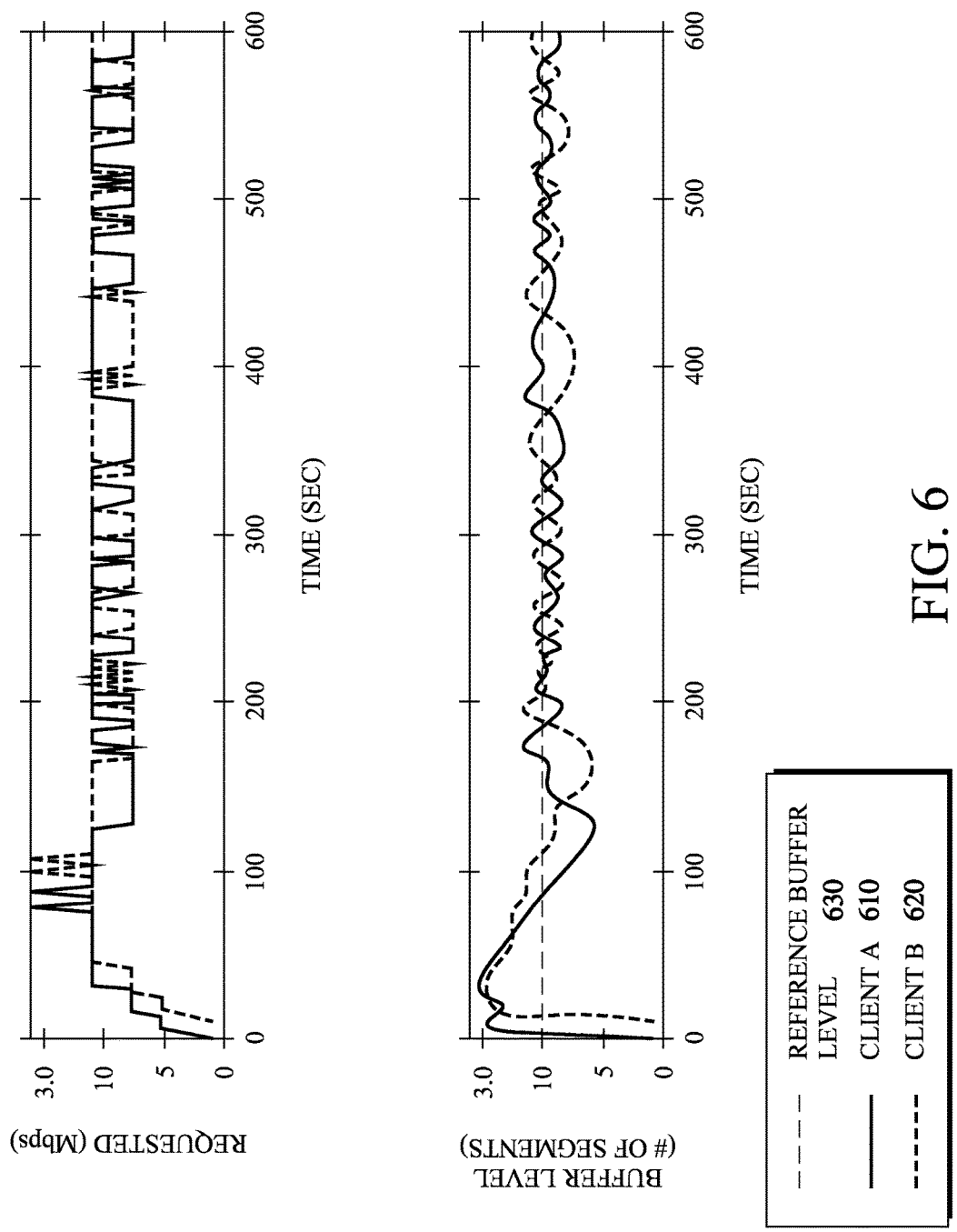
FIG. 6 illustrates an example of network performance under an HTTP streaming client adaptation algorithm based on proportional-integral control.

FIG. 6 illustrates an example of network performance under the HTTP streaming client adaptation algorithm based on proportional-integral control that is disclosed herein. As shown in FIG. 6, competing HTTP client devices 610 and 620 reside on the same network, and are each engaged in respective HTTP streaming sessions over a common communications link. Under this scenario, the common communications link, over which the client devices 610 and 620 may request data segments and receive the requested data segments, may suffer from a bottleneck.

However, under the HTTP streaming client adaptation algorithm disclosed herein, as illustrated in the uppermost graph of FIG. 6, the requested rates of both clients quickly converge to their "fair share" of bandwidth, without the oscillations observed in FIG. 5. Illustratively, the requested bitrate (Mbps) of devices 610 and 620 converge to the bandwidth "fair share" after approximately 150 seconds of the HTTP streaming session. Furthermore, as illustrated in the lowermost graph of FIG. 6, the buffer levels of devices 610 and 620 may each level-off to the reference buffer level 630. Illustratively, the device buffer levels 610 and 620 level-off to the reference buffer level 630 after approximately 200 seconds of the HTTP streaming session. Consequently, the requested video source rate may eventually match the available bandwidth in the network, unlike the scenario illustrated in FIG. 5. Thus, the client devices 610 and 620 may adhere to their respective share of the available network bandwidth.

Figure 7:
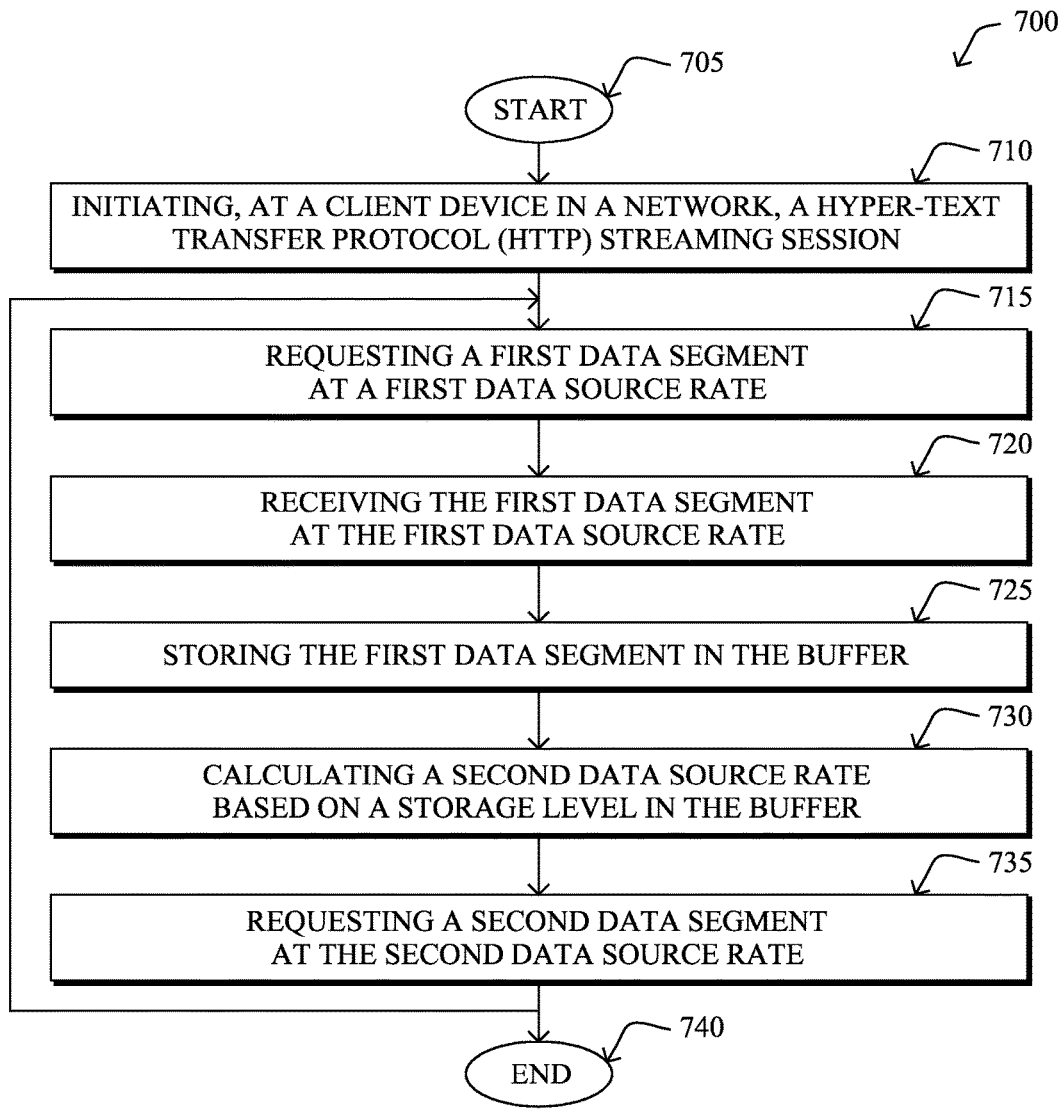
FIG. 7 illustrates an example simplified procedure for adaptive HTTP streaming with multiple client devices in a network.

FIG. 7 illustrates an example simplified procedure for adaptive HTTP streaming with multiple client devices in a network. As shown in FIG. 7, the procedure 700 may start at step 705, continue to step 710, and so forth, where, as described in greater detail above, a second data source rate is calculated based on a storage level in the client device buffer.

At Step 710, the procedure 700 includes initiating, at a client device in a network, a Hyper-Text Transfer Protocol (HTTP) streaming session. The client device may have a buffer and may be configured to request and receive one or more data segments over HTTP from an HTTP server. At Step 715, a first data segment is requested at a first data source rate. Then, at Step 720, the first data segment is received at the first data source rate. After receiving the requested data segment, at Step 725, the first data segment is stored in the buffer. Next, at Step 730, a second data source rate is calculated based on a storage level in the buffer. At Step 735, a second data segment is requested at the second data source rate. After Step 735, the adaptive HTTP streaming process may continue until the HTTP streaming session is completed (e.g., Steps 715-735). Thus, the procedure 700 may return to Step 715. The procedure 700 illustratively ends at Step 740 (e.g., when the HTTP streaming session is completed. The techniques by which the steps of procedure 700 are performed, as well as ancillary procedures and parameters, are described in detail above.

It should be understood that the steps shown in FIG. 7 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for achieving a stable share of bandwidth among competing adaptive HTTP streaming sessions in a distributed fashion. According to the disclosed embodiments, only the client adaptation algorithm may need to be modified. No changes may be required at the server(s), and no coordination may be necessary within the network. Therefore, the disclosed embodiments conform to the client-driven nature of existing HTTP streaming systems. Importantly, the proposed PIC client adaptation outperforms existing commercially-deployed schemes, by achieving stable network utilization over a bottleneck link, and yielding less video variations over time.

While there have been shown and described illustrative embodiments that provide for adaptive HTTP streaming algorithms, it is to be understood that various other adaptations and modifications may be made within the spirit and scope of the embodiments herein. For example, the embodiments in their broader sense may be used in conjunction with various types of shared-media networks and/or protocols (e.g., wireless). In addition, while certain protocols are shown, other suitable protocols may be used accordingly, including alternative protocols to HTTP.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus comprising one or more network interfaces that communicate with a network, a processor coupled to the one or more network interfaces and configured to execute a process; and a memory configured to store program instructions which contain the process executable by the processor, wherein the process is described in detail above. Moreover, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

initiating, at a client device in a network, a Hyper-Text Transfer Protocol (HTTP) streaming session, wherein the client device has a buffer and is configured to request and receive one or more data segments over HTTP from an HTTP server;

requesting, by the client device, a first data segment at a first data source rate;

receiving, by the client device, the first data segment at the first data source rate;

storing, by the client device, the first data segment in the buffer;

identifying, by the client device, a second data source rate for a next data segment in the HTTP streaming session by summing 1) the first data source rate, 2) a difference between a current storage level in the buffer and a predetermined reference storage level in the buffer, and 3) a difference between the current storage level in the buffer and a previous storage level in the buffer;

in response to identifying the second data source rate, requesting, by the client device, the next data segment at the second data source rate identified by the device;

receiving, by the client device, the next data segment at the second data source rate; and continuing, by the client device, to adapt data source rates of subsequent data segments in the HTTP streaming session until the HTTP session is complete.

2. The method as in claim 1, further comprising:
calculating the second data source rate and requesting the next data segment at the second data source rate substantially immediately after the first data segment is requested.

3. The method as in claim 1, wherein the calculating of the second data source rate is further based on a predetermined reference storage level in the buffer.

4. The method as in claim 1, wherein the calculating of the second data source rate is further based on the first data source rate.

5. The method as in claim 1, further comprising:
adjusting one or more of: the first predetermined scaling parameter and the second predetermined scaling parameter.

6. The method as in claim 1, wherein the first data segment and the next data segment are a first video segment and a second video segment, respectively.

7. The method as in claim 1, further comprising:
determining a buffer playout duration based on the storage level in the buffer.

8. The method as in claim 1, wherein:
the client device is engaged in the HTTP streaming session while a plurality of other client devices in the network are engaged in respective HTTP streaming sessions, and
the client device and the plurality of other client devices receive data segments over a shared communications link.

9. The method as in claim 1, further comprising:
determining whether the buffer is full, wherein the next data segment is requested only when the buffer is not full.

10. An apparatus, comprising:
one or more network interfaces that communicate with a network;
a processor coupled to the one or more network interfaces and configured to execute a process; and
a memory configured to store program instructions which contain the process executable by the processor, the process comprising:
initiating, as a client device in the network, a Hyper-Text Transfer Protocol (HTTP) streaming session, wherein the client device has a buffer and is configured to request and receive one or more data segments over HTTP from an HTTP server;

requesting a first data segment at a first data source rate;

receiving the first data segment at the first data source rate;

storing the first data segment in the buffer;

identifying a second data source rate for a next data segment in the HTTP streaming session by summing 1) the first data source rate, 2) a difference between a current storage level in the buffer and a predetermined reference storage level in the buffer, and 3) a difference between the current storage level in the buffer and a previous storage level in the buffer;

in response to identifying the second data source rate, requesting the next data segment at the second data source rate identified by the device;

receiving the next data segment at the second data source rate; and continuing to adapt data source rates of subsequent data segments in the HTTP streaming session until the HTTP session is complete.

11. The apparatus as in claim 10, wherein the process further comprises:
calculating the second data source rate and requesting the next data segment at the second data source rate substantially immediately after the first data segment is requested.

12. The apparatus as in claim 10, wherein the calculating of the second data source rate is further based on a predetermined reference storage level in the buffer.

13. The apparatus as in claim 10, wherein the calculating of the second data source rate is further based on the first data source rate.

14. The apparatus as in claim 10, wherein the process further comprises:
adjusting one or more of: the first predetermined scaling parameter and the second predetermined scaling parameter.

15. The apparatus as in claim 10, wherein the first data segment and the next data segment are a first video segment and a second video segment, respectively.

16. The apparatus as in claim 10, wherein the process further comprises:
determining a buffer playout duration based on the storage level in the buffer.

17. The apparatus as in claim 10, wherein:
the client device is engaged in the HTTP streaming session while a plurality of other client devices in the network are engaged in respective HTTP streaming sessions, and
the client device and the plurality of other client devices receive data segments over a shared communications link.

18. The apparatus as in claim 10, wherein the process further comprises:
determining whether the buffer is full, wherein the next data segment is requested only when the buffer is not full.

19. A tangible non-transitory computer readable medium storing program instructions that cause a computer to execute a process, the process comprising:
initiating an HTTP streaming session at a client device in a network, wherein the client device has a buffer and is configured to request and receive one or more data segments over HTTP from an HTTP server;

requesting a first data segment at a first data source rate;

receiving the first data segment at the first data source rate;

storing the first data segment in the buffer;

identifying a second data source rate for a next data segment in the HTTP streaming session by summing 1) the first data source rate, 2) a difference between a current storage level in the buffer and a predetermined reference storage level in the buffer, and 3) a difference between the current storage level in the buffer and a previous storage level in the buffer;

in response to identifying the second data source rate, requesting the next data segment at the second data source rate identified by the device;

receiving the next data segment at the second data source rate; and continuing to adapt data source rates of subsequent data segments in the HTTP streaming session until the HTTP session is complete.

20. The tangible non-transitory computer readable medium of claim 19, wherein the process further comprises;

calculating the second data source rate and requesting the next data segment at the second data source rate substantially immediately after the first data segment is requested.

* * * * *